(No Model.)
2 Sheets—Sheet 1.
F. CHALLONER.
SHINGLE SAWING MACHINE.
No. 318,956. Patented June 2, 1885.
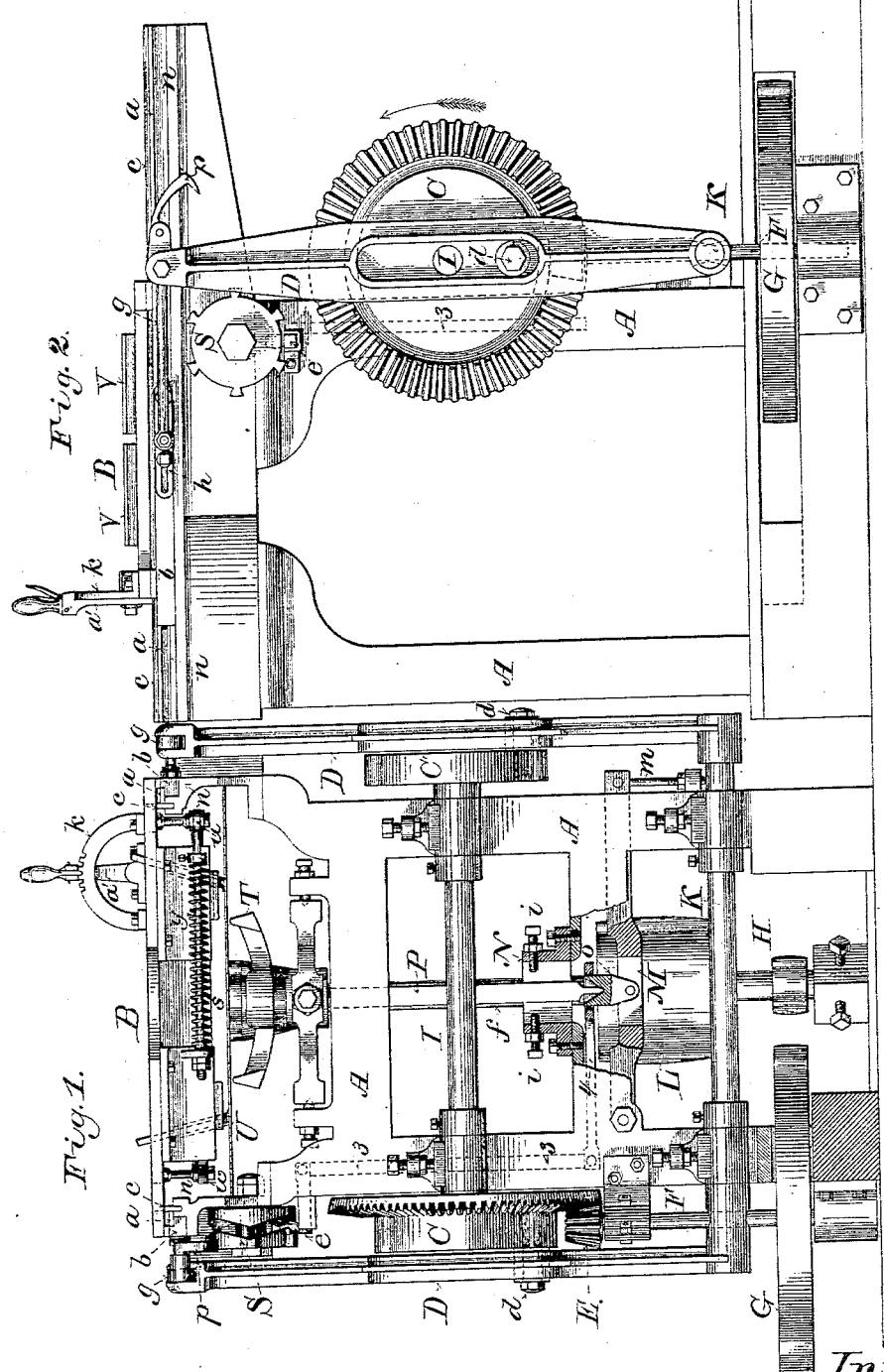
Witnesses:
Chas. L. Goss.
George Toll.
Inventor,
Frank Challoner
per O. H. Bottum,
Attorney.

(No Model.) 2 Sheets—Sheet 2.

F. CHALLONER.
SHINGLE SAWING MACHINE.

No. 318,956. Patented June 2, 1885.

Witnesses:
Chas. L. Goss.
George Goll.

Inventor,
Frank Challoner.
per P. H. Bottam.
Attorney.

UNITED STATES PATENT OFFICE.

FRANK CHALLONER, OF OMRO, WISCONSIN.

SHINGLE-SAWING MACHINE.

SPECIFICATION forming part of Letters Patent No. 318,956, dated June 2, 1885.

Application filed February 5, 1884. (No model.)

*To all whom it may concern:*

Be it known that I, FRANK CHALLONER, of Omro, in the county of Winnebago and State of Wisconsin, have invented certain new and useful Improvements in Shingle-Machines; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to shingle-machines;
and it consists, essentially, of an improved automatic feed, of compound ways whereby the machine is adapted to be used either with a power or hand carriage, and of a tubular self-lubricating hand-carriage. Its objects are, first, a simple and effective means for reciprocating the power-carriage, whereby the same is caused to feed slowly and return quickly without binding or wearing unevenly in its ways; and, second, a machine adapted for use with interchangeable power and hand carriages, whereby the shingle-bolts may be worked up closely and economically.

In the accompanying drawings like letters of reference refer to the same parts in each figure.

Figure 3:
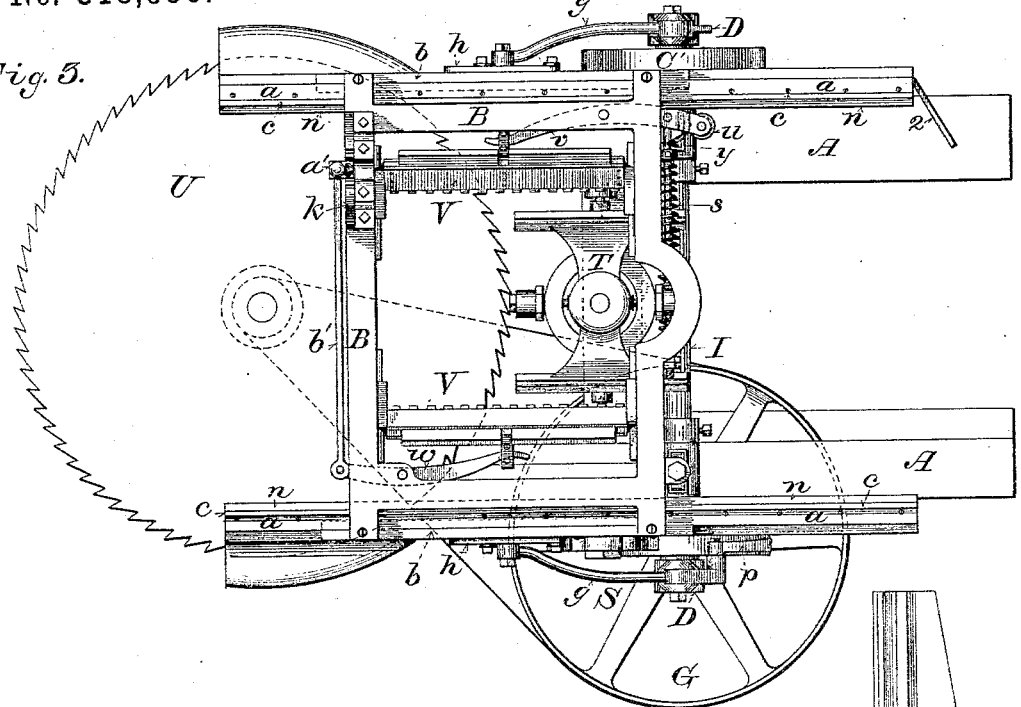
Figures 4, 5, 6:
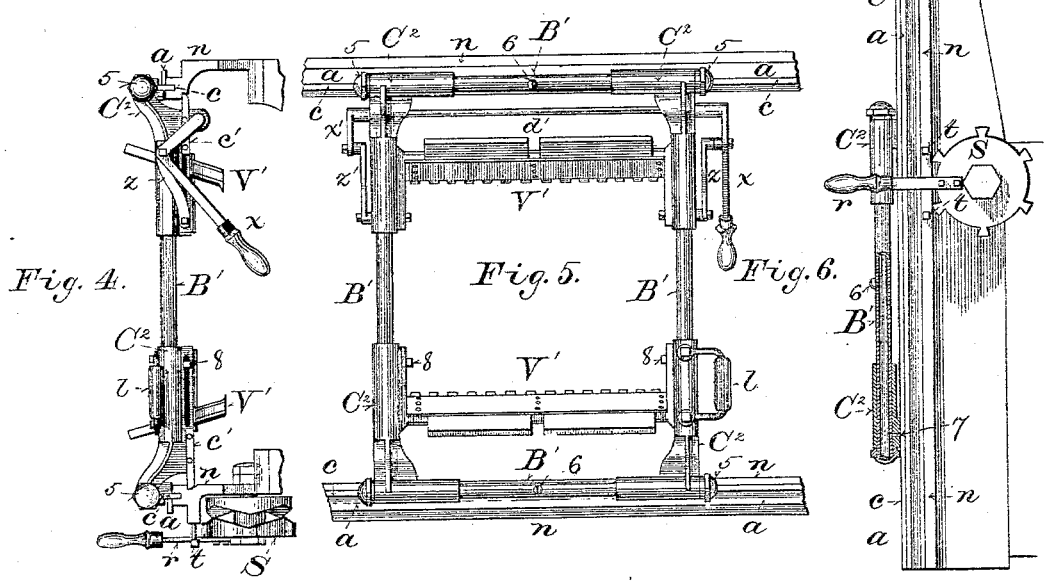

Figure 1 is a front elevation of my improved machine with portions of the frame cut away to show the mechanism for tilting the grate. Fig. 2 is a side elevation of the same. Fig. 3 is a plan view; and Figs. 4, 5, and 6 are detail views of the hand-carriage in connection with the ways upon which it travels, Fig. 4 showing a front, Fig. 5 a plan, and Fig. 6 an end view, of said carriage.

A is the frame-work of the machine. U is the slicing-saw mounted upon the perpendicular arbor $f$, suitably journaled in said frame. Upon the top of frame A rest the longitudinal ways $nn$, upon which the reciprocating carriage B is driven back and forth over the slicing-saw U. Said carriage B is provided with dogs V V for holding the shingle-bolts. One of said dogs is made adjustable in position by means of the lever $a'$, acting through connecting-rod $b'$ and lever $w$ upon the rear of said dog. Lever $a'$ is provided with a spring-catch, which moves about the indented arc $k$ and engages with the notches therein when released, so as to hold the dog controlled by said lever $a'$ in any desired position. The other dog V is operated by the spiral spring $s$, acting thereon through rod $y$ and pivoted lever $v$, which is connected at one end with the rear of said dog and at the other with rod $y$. The front end of lever $v$ is provided with the friction-roller $u$, which strikes the inwardly-bent arm 2, compressing spring $s$, and retracting the dog, whereby the shingle-bolt is released and allowed to drop upon the tilting grate T, when the carriage B comes directly over said grate in its return from the slicing-saw. The tilting grate T is provided with the vertical stock P, which passes through a universal joint-support, which has bearings in a cross-piece of frame A, and rests upon its lower tapered end in the cup $o$, pivoted in slotted cross-lever M. The stock P passes through the slotted block N, and is limited in its movement by means of the adjusting-bolts $i\ i$.

S is a cam pivoted to the side of frame A, through which passes the short horizontal slide $e$, provided at the outer end with a small friction-roller, which travels in the groove of cam S and connected at the inner end with rod 3, which is pivoted to the inside of frame A, and is in turn connected with stock P by the rod 4, looped at the end to pass around said stock P just above said cup $o$, whereby said stock P, with its superposed grate T, is tilted alternately to the right and left with each advance of the carriage B.

The construction, arrangement, and operation of the foregoing parts of my improved machine are substantially described in the specification of Letters Patent granted by the United States to George Challoner, bearing date April 22, 1879, and numbered 214,490, and they are here described for the purpose of defining more clearly the improvements hereinafter set forth.

The power-carriage B is provided at its ends with the guides $b\ b$, which are adapted to and slide freely in exterior grooves cut in ways $n\ n$. Said guides $b\ b$ are rabbeted on their inner upper edges to receive the overlapping of plates $a\ a$, by which said guides and carriage are held in said ways $n\ n$.

As heretofore constructed, the carriage-ways have opened inwardly and have been exposed to dust from the saw, whereby the movement of the carriage was impeded. This objection I overcome by the improved arrangement above described of guides b b running in ways opening outward.

D D are levers or yokes fixed near the base of the machine upon the ends of the transverse shaft K, having bearings in or secured to frame A. The upper ends of said yokes D are adjustably connected with the ends of carriage B by means of the connecting-rods g g and slotted plates h h. By thus arranging and connecting said yokes D with carriage B power is applied equally to the ends of said carriage, thereby causing the guides and the ways in which they travel to wear evenly and preventing the same from binding against each other. The feeding mechanism is also out of the way of the operator, who stands in front of the machine. A transverse shaft, I, journaled in frame A directly above and parallel to shaft K, is provided at one end with the bevel-gear C, and at the other end with the crank-wheel C', from which project the crank-pins d d, bearing small friction-rollers, which project through and travel in central vertical slots in said yokes. A small bevel gear keyed to the upper end of vertical shaft F meshes with the gear C. Upon said shaft F is also keyed the pulley G, which is driven by means of a belt from the small pulley H, fixed upon the perpendicular arbor of saw U. The connecting-rod g on the same side of the machine with the cam S is extended in front and formed into an ear, to which is pivoted the gravitating pawl p, which, as the carriage B advances over saw U, engages each time with the spurs projecting from the periphery of cam S, and causes said cam to make a part of a revolution, tilting the grate T, as hereinbefore described, to the right and left alternately.

As heretofore constructed, the rod 3 has been located on the outside of frame A, and the small friction-roller traveling in the groove of cam S has been mounted upon the upper end of said rod. By the use of the offset or slide e, I now place the rod 3 inside of said frame A, where it is out of the way and less liable to injury. With a power-carriage alone it is impossible to work the bolts down closely, there being sufficient material for from two to four shingles left in each block or bolt as it is thrown from the machine. These fragmentary bolts are conveniently placed or piled as they come from the machine, and when a sufficient number is collected the power-carriage is disconnected, the hand-carriage B' substituted in its place, and the material thereby worked up to the last shingle. A single machine is thus made to perform the work which has heretofore required two machines with double the power and labor to run them.

To adapt my machine for use with a hand-carriage, as B', I provide the narrow hardened steel ways c c, set into and secured in the ways n n of the power-carriage and rising a little above them; and for tilting the grate T, which forms the butts and points of the shingles, I also provide a small hand-lever, r, bolted temporarily to the face of cam S, midway between two adjacent spurs upon its periphery. The lever r is limited to the required amount of travel (equal to that portion of a revolution given to said cam by the pawl p) by the stops t t, projecting from the way n or the frame of the machine. Turning the cam S by means of said lever back and forth over said limited part of a revolution produces the same effect as when it is turned by the pawl p in a single direction—that is, the grate T is thereby tilted alternately to the right and left, Figs. 4, 5, and 6.

I have shown and described the hand-carriage and the attachments used in connection therewith for the purpose of more fully illustrating the scope of the machine in its operation; but I do not here claim the hand-carriage *per se*. I may make it the subject of another application for Letters Patent.

My improved machine operates as follows: When used with the automatic power-carriage B, the saw U is first set in motion by means of suitable power applied to the driving-pulley L on its arbor f. A shingle-bolt is then placed upon the grate T between dogs V V of carriage B, which is now set in motion by tightening the belt around pulleys H and G. Motion is thereby communicated through gears E and C to the yokes D D and carriage B. The gear C and crank-wheel C', turning in the direction indicated by the arrow in Fig. 2, the crank-pins d d, with their friction-rollers, will describe that half of their revolution farthest from the pivot of said levers D when the carriage advances. The power exerted upon said carriage will consequently be greater and its movement will be slower as it advances over the slicing-saw U. The return of the carriage will be quicker, and the power exerted thereon correspondingly less, as the crank-pins d d then make that half of their revolution nearest to the pivot of levers or yokes D. The object of this arrangement is to secure the greatest power upon the carriage and a slow movement when the saw is slicing a section from the shingle-bolt, and the quicker movement with the least power when the carriage makes its return. With each advance of the carriage B the pawl p engages with one of the spurs on the periphery of cam S, causing said cam to make a partial revolution, and thereby tilting the grate T through slide e, lever 3, and connecting-rod 4, alternately to the right and left. As the carriage B advances, the friction-roller u leaves the arm 2, thereby releasing spring s, the expansion of which thrusts the right-hand dog V against the shingle-bolt, and clasps it firmly between itself and the other dog V. As the carriage B returns, the roller u strikes the arm 2, and thereby withdraws the dog V from engagement with the shingle-bolt, allowing it to drop upon the grate T, from which it gets the proper inclination to form the butt and point of the shingle. The pitch or inclination of the grate T to either side is made equal to the required bevel of the shingle, the butts and points of which are varied as desired by limiting the throw of the stock P by means of the adjusting-bolts *i i*. The thickness of the shingle may be adjusted as desired by raising or lowering the lever M, supporting the pivoted cup *o* by means of threaded rod *m* and the adjusting-nut thereon.

When used as a hand-machine, the mechanism for driving the power-carriage B is disconnected therefrom, the power-carriage removed and a hand-carriage, as B′, which moves easily on the ways *c c*, substituted in its place. The hand-carriage is fed and its dogs V′ V′ are operated by hand. The tilting grate T is also operated by hand by means of the lever *r*. Otherwise the operation of the machine is the same as when the power-carriage is used.

Having thus described my invention, what I claim as new, and desire to secure by Letters Patent, is—

1. In a shingle-machine, the combination, with the power-carriage ways *n n*, and slicing-saw U, of the narrow hand-carriage ways *c c*, raised upon and supported by said ways *n n*, parallel thereto, and a light removable hand-carriage, substantially as and for the purposes set forth.

2. The combination, in a shingle-machine, of the power-carriage B, rabbeted on the inner upper corners to receive the overlapping cap-plates *a a*, the externally-rabbeted ways *n n*, in which said guides *b b* are adapted to slide, and cap-plates *a a*, substantially as and for the purposes set forth.

3. The combination, in a shingle-machine, of a carriage, B, provided with guides *b b*, the ways *n n*, grooved to receive said guides *b b*, upright yokes D D, secured at their lower ends upon the ends of the transverse shaft K, and connected at their upper ends with the ends of said carriage B, and wheels C C′, mounted upon the ends of the transverse shaft I, and provided with the crank-pins and friction-rollers *d d*, passing through central vertical slots in said yokes D D, together with mechanism for rotating said wheels C C′, substantially as and for the purposes set forth.

4. In a shingle-machine, the combination of a power-carriage adapted to move back and forth over the slicing-saw in ways raised upon the frame of said machine, together with yokes D D, pivoted at their lower ends to said frame, connected at their upper ends with said carriage by means of pivoted rods *g g* and slotted adjusting-plates *h h*, and provided with the central vertical slots through which protrude the crank-pins and friction-rollers of gear C and crank-wheel C′, shaft I, having bearings in the frame of the machine, and supporting gear C, and crank-wheel C′ at its ends, and small bevel-gear E mounted on the top of vertical shaft F, to which is keyed the driving-pulley G, substantially as and for the purposes set forth.

5. In a shingle-machine, the combination of the ways *n n*, provided with outwardly-opening grooves to receive the guides *b b* of the carriage B, and of the narrow steel ways *c c*, set into and secured in ways *n n*, substantially as and for the purposes set forth.

6. In a shingle-machine, the combination of carriage B, yokes D D, pivoted below to the frame A, and connected with the ends of said carriage by rods *g g*, gravitating pawl *p*, pivoted to the front end of one of said rods *g*, cam S, tilting grate T, provided with upright stock P, which rests in pivoted cup *o*, together with their connections, and mechanism, as described, for vibrating said yokes D D, substantially as set forth.

7. In a shingle-machine, the combination, with the slicing-saw U and tilting grate T, of the power-carriage ways *n n*, and the narrow hand-carriage ways *c c*, raised thereon and supported by said ways *n n*, and the interchangeable power-carriage B and hand-carriage B′, substantially as and for the purposes set forth.

8. The combination, in a shingle-machine, of a hand-carriage, ways *c c*, upon which it moves back and forth over the saw U, tilting grate T, provided with stock P, which is supported in the cup *o*, pivoted in the lever M, cam S, and actuating hand-lever *r*, together with their connections, substantially as and for the purposes set forth.

In testimony that I claim the foregoing as my own I affix my signature in presence of two witnesses.

FRANK CHALLONER.

Witnesses:
 D. J. BARDWELL,
 P. M. WRIGHT.